Dec. 20, 1966   C. R. JOLLY   3,292,497
INDEXING FIXTURE
Filed Oct. 13, 1964   2 Sheets-Sheet 1
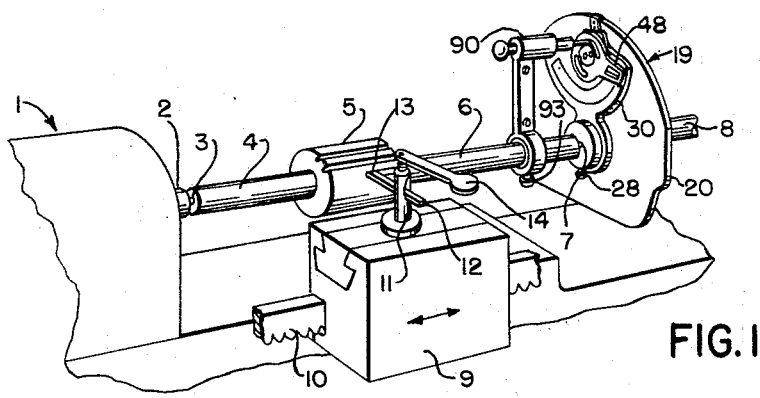
FIG. 1
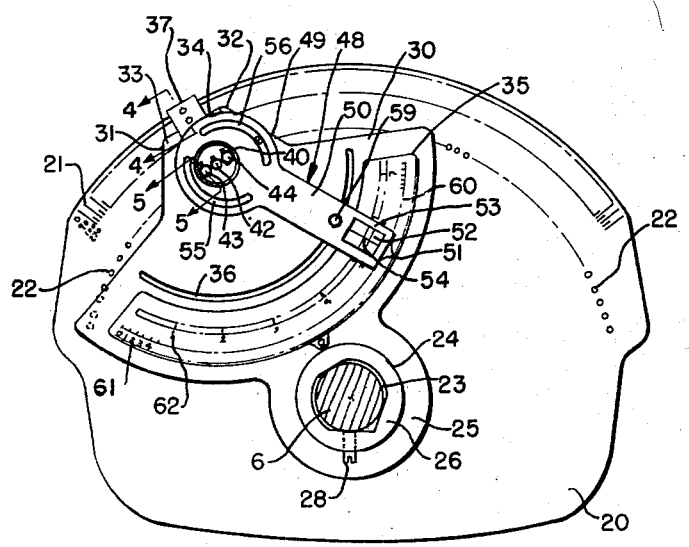
FIG. 2
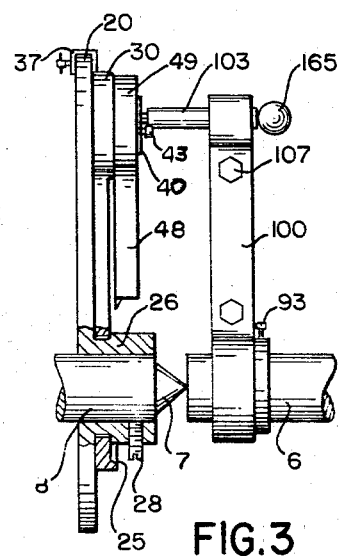
FIG. 3
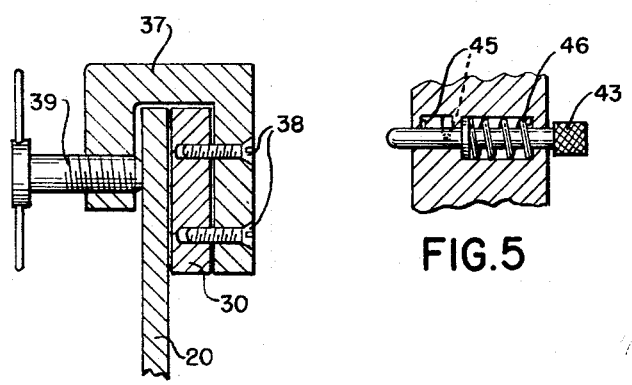
FIG. 4
FIG. 5
INVENTOR.
CLAUDE R. JOLLY
BY *Wm. R. Price*
ATTORNEY Dec. 20, 1966  C. R. JOLLY  3,292,497
INDEXING FIXTURE Filed Oct. 13, 1964  2 Sheets-Sheet 2

INVENTOR.
CLAUDE R. JOLLY

BY  *Wm. R. Price*

ATTORNEY

United States Patent Office 3,292,497
Patented Dec. 20, 1966

3,292,497
INDEXING FIXTURE
Claude R. Jolly, 948 E. Maple St.,
Jeffersonville, Ind. 47130
Filed Oct. 13, 1964, Ser. No. 403,619
5 Claims. (Cl. 90—56)

This invention relates generally to an indexing fixture adapted for use on machine tools such as engine lathes, milling machines and the like in the cutting of gears or similar operations and commonly known as dividing or indexing heads. More specifically, this invention relates to an indexing fixture adapted for turning a work piece suspended between centers of an engine lathe or the like in pre-determined increments and locking same into position for the machining operation.

Dividing heads heretofore employed are somewhat complicated and expensive of construction. By reason of their construction and of the principles on which they are based, the operation of many of these devices is somewhat limited and their applicability limited to a particular type or size of machine tools. Furthermore, with many of these devices complicated mathematical operations must be performed to set the device for the desired number of divisions which increases the chance of error. All this is well known to those skilled in the art.

It is therefore an object of this invention to provide an indexing fixture which is simple and inexpensive.

Another object of this invention is the provision of apparatus for directly revolving and anchoring the work at a pre-determined point of division.

Still another object of this invention is the provision of apparatus whereby the work may be directly indexed and engaged with an indexing plate attached to the tail stock spindle so that the automatic features of the machine tool may be fully utilized.

Still other objects will occur to those skilled in the art from the following description.

Referring now to the drawings:

FIG. 1 is a view in perspective of my invention showing a fragment of an engine lathe and the relation of my invention to the work piece and to the tail stock spindle;

FIG. 2 is a front elevation of the indexing plate assembly illustrating in some detail the relation of the various parts one to the other;

FIG. 3 is a sectional view taken along lines 3—3 of FIG. 2 which illustrates the locking device in relation to the master plate and the dial plate;

FIG. 4 is a sectional view taken along lines 4—4 of FIG. 2 illustrating the clamping mechanism;

FIG. 5 is a sectional view taken along lines 5—5 illustrating the construction of the dial pins and their relation to the dial plate and the master plate;

Figures 6, 7:
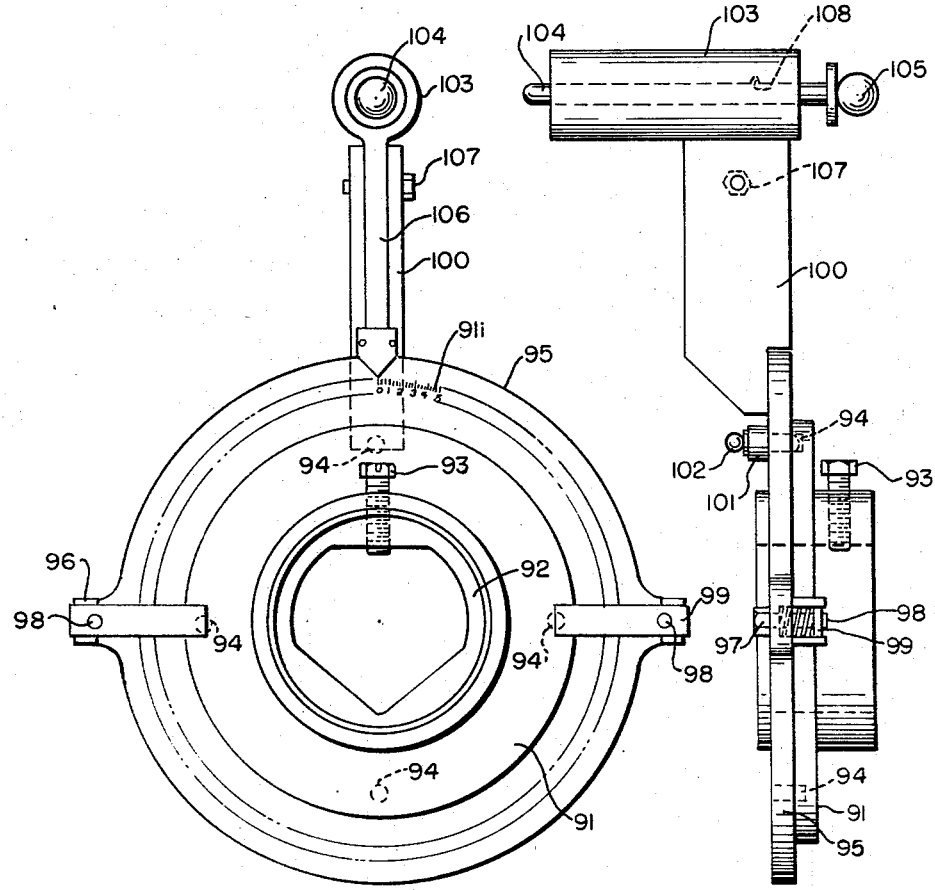
FIG. 6 is a front elevation of the holding fixture assembly.
FIG. 7 is a side elevation of said holding fixture assembly.

Referring now in detail to the drawings wherein like characters of reference are employed to designate the same parts in various views, an engine lathe 1 of conventional construction is fragmentarily illustrated comprising a head stock spindle 2 having a live center 3 which is engaged with a mandrel 4 holding work piece 5 and a mandrel 6 in engagement with the dead center 7 of the tail stock spindle 8. The carriage 9, which moves longitudinally by means of rack 10 and pinion gear (not shown), supports post 11 which contains bit holding member 12 and bit 13 shown in operative relation with work piece 5. Wrench 14 at the top of the post is of standard construction. It will be noted that the holding fixture assembly 90 is connected to the work holding mandrel 6 and that the indexing plate assembly 19 is fixedly supported on the tail stock spindle.

The indexing plate assembly 19 consists of a master plate which in the embodiment illustrated is in the general shape of a shell. Said plate contains indicia 21 which in the illustrated embodiments are marked in half degrees and numbered every five degrees in four rows. The first row extends from 0 to 90°; the second from 90° to 180°; the third from 180° to 270°; and the fourth from 270° to 360°. Below the indicia 21 are a series of evenly spaced holes 22 placed across the master plate 20 in the form of an arc, said holes being spaced three degrees apart. Near the bottom and at the center of said plate is a hole 23 of a size suitable for the provision of flanged hub 24. Flange 25 is provided for the provision of an adapter bushing 26 which has a flange 27 for holding dial plate 30. A set of keeper screw 28 is adapted to engage the assembly in locked position against the tail stock spindle 8. Dial plate 30 has a pair of shoulders 31 and 32 at the top which contains scribe marks 33 and 34, respectively. Toward the center of the dial plate is a large arc-shaped opening 35 which is provided for the index plate 60 which will be discussed in more detail. Directly above the arc-shaped opening 35 is an arcuate slot 36 which extends 60° to the right and 60° to the left. Near the top of the dial plate 30 is located a locking device 37 which is held in position by screws 38 and is adapted to be locked into position against master plate 20 by means of set screw 39. Below the locking device is located a dial post 40 which is secured to the dial plate 30 by means of screws 41. The dial post contains three spring loaded dial pins 42, 43 and 44 which are biased by spring 46 and which are provided with engagement dog 45 to be held in disengaged position. Journaled on the dial post 40 is a dial arm 48 which consists of a circular head 49 and an elongated leg 50 which terminates in pointer 51. Directly above pointer 51 is a square sight space 52 which is equipped with a glass 53 and a hairline 54. In the circular head 49 of the dial arm 48 is located a lower and upper arcuate slot designated by numerals 55 and 56, respectively. A bolt 57 is located in the leg portion 50 of the dial arm so as to project through arcuate slot 36 of the dial plate 30 and which contains head 58 and a locking nut 59. It will be seen that the dial arm may be moved through the radius defined by circular slot 36 and locked into position by means of bolt 57 and locking nut 59.

As previously indicated, an index plate 60 fits into the arc-shaped opening 35 and is held in position by screws. In the embodiment shown, indicia 61 are numbered as minutes and divided between minutes in four equal portions of 15 seconds each. Additionally, indicia 62 may be provided, which in the illustrated embodiment are marked as sevenths of a degree. Other spaced indicia may be provided in index plate 60 such as fractions which are not divisible in minutes and seconds in even numbers. As, for example, elevenths, thirteenths, seventeenths, etc.

Referring now to FIGS. 6 and 7, the work holding fixture 90 consists of work holding disc 91 which, in turn, contains a hub 92 having a V-shaped hole and a set screw 93 adapted to anchor the work holding disc against a work holding mandrel or work piece. Work holding disc 91 is illustrated with indicia 91–I containing evenly marked spaces of one degree. Work holding disc 91 contains near its outer periphery four holes 94 which are spaced 90° apart. Lying adjacent to work holding disc 90 is work holding arm disc 95 which contains two lateral projections 96 having a hole 97 through which bolt 98 may be engaged with lug 99. This arangement allows disc 95 and disc 91 to be held in position so that disc 91 is rotatable relative to disc 95. Connected to the work holding arm disc 95 is a split arm 100. Dial post 101 is located in the rear of work holding arm disc 95 and in conjunction with dial pin 102 functions to hold discs 95 and 91 in engagement through holes 94. The indexing finger 103 which consists of a sleeve and a spring loaded plunger 104, having a knurled knob 105 is welded to an adjustable projection bar 106 which fits into split arm member 100 and is held in position by bolt 107. The spring loaded plunger is equipped with an engagement dog to hold the plunger in disengaged position.

*Operation*

In operation, the indexing plate assembly 19 is mounted directly onto the tail stock spindle 8 and locked into position by keeper screw 28.

The holding fixture assembly 90 is mounted directly onto the work piece 5 or onto the work piece mandrel 6 and locked into position by means of set screw 93. In this position, the plunger 104 of the indexing finger 103 engages with the lower arcuate slot 55 of the indexing plate assembly 19 so that the work piece is locked into position through the engagement of the holding fixture assembly 90 and the indexing plate assembly 19. In the disclosed embodiment, dial pins 42, 43 and 44 are set so as to alternately engage with one of the holes in series 22 and thus move the dial plate 30 in increments of 1°. If the work is from left to right, scribe mark 33 is placed at 0° and the middle dial pin 42 is engaged in one of the holes 22. To move the plate 1° the middle dial pin 42 is disengaged and the dial plate is moved so that scribe mark 33 registers with the indicia for 1° and dial pin 43 is engaged in the appropriate hole. For 2° the dial plate 30 is again moved and dial pin 43 is engaged, etc. Thus, the dial pins through their alternate engagement with one of the holes in the series 22 effectively locks the dial plate 30 against the master plate 20 at the appropriate setting. The plunger 104 of indexing finger 103 engages (for right-handed work) into arcuate slot 55 and thus movement of the dial plate 30 moves the indexing finger 103 and the entire holding fixture assembly directly connected to the work piece or work piece mandrel to revolve same. If it is necessary to move the work piece a number of minutes or a number of minutes and seconds, the dial arm 48 is moved to the appropriate minute or second position indicated by the pointer 51 registering with indicia 61. In making this movement, the indexing finger 103 follows the surface of the arcuate slot 55 (for right-hand work) which acts as a cam surface to move the indexing finger and the entire work piece 5 through the movement of the holding fixture assembly 90. In the embodiment disclosed, indicia 61 are marked as minutes containing four subdivisions of 15 seconds each. Thus, divisions may be made down to 15 seconds of a degree. Once the pointer is at the correct setting, the dial arm 48 is engaged by tightening of the lock nut 59 onto bolt 57 which fits into arcuate slot 36. This locks the dial arm against index plate 30. The indexing plate assembly therefore is locked onto the tail stock spindle 8 by means of keeper screw 28. The dial plate 30 is locked against the master plate 20 by means of engagement of one of the dial pins 42, 43 or 44 with one of the holes in the series of holes 22. The dial arm is locked by means of the locking nut 59 and bolt 57.

If the division requires a fraction of a degree, such as one or more sevenths, indicia 62 may be utilized so that the hairline 54 of sight space 52 of dial arm 48 registers with said indicia. The cam action of arcuate slot 55 on the indexing finger 103 is identical so that the work piece is revolved the right fraction of a degree through movement of the entire holding fixture assembly 90. Additional indicia such as other fractions of a degree which cannot be evenly divided into minutes and seconds may be placed on the index plate 60. Such fractions are elevenths, thirteenths, seventeenths, etc.

The operation of the apparatus has been designed for right-hand and left-hand work. If left-hand work is involved, the indexing finger is placed in arcuate slot 56 rather than arcuate slot 55. These slots have been designed to move the holding fixture assembly through an arc of 1° through engagement with the plunger 104 of indexing finger 103, however, it is within the scope of this invention to provide a slot having a suitable radius to move the holding fixture assembly through an arc of less than 1°. Thus, if the slot were designed for moving the fixture through an arc of ½°, the indicia would be effectively divided in half, thus providing a subdivision of 7½ seconds rather than 15 seconds as disclosed herein. Further, it is within the scope of this invention to utilize removable index plates 60 which contain indicia in still further subdivisions than those disclosed.

*Use of locking device*

In operations requiring divisions of even degrees or of ½ degree, the locking device 37 may be utilized. Thus, it is only necessary to move the dial plate 30 the desired number of degrees as indicated by indicia 21 and tighten dial plate 30 to master plate 20 by tightening of set screws 39 of the locking device 37. The indexing finger 103 engaged in arcuate slot 55 moves the work piece in the manner previously described. Further, the work piece may be moved in minutes or seconds by movement of dial arm 48 and the resulting cam action of arcuate slot 55 on indexing finger 103, all as previously indicated.

*Use of face plate*

Figure 8:
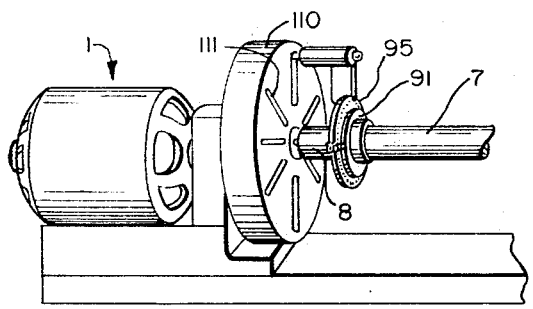
FIG. 8 is a fragmentary perspective view illustrating the use of the holding fixture assembly with a conventional face plate.

As illustrated in FIG. 8, the holding fixture assembly 90 may be used in conjunction with a conventional face plate 110 such as that illustrated.

In this embodiment, the indicia 91–I are used to indicate the proper divisions. The holding fixture assembly locks the work piece 5 into position by engagement of the plunger 104 of indexing finger 103 into grooves 111 of the face plate. This embodiment is of primary use in rougher indexing operations involving divisions of an even number of degrees.

The dial pin 102 is used to fit into hole 94 of work holding disc 91 so that a shaft having been rotated through 90° may be rotated through another 90° by moving the work holding arm disc back to fit the dial pin 102 into the next hole 94. Since the holes 94 are spaced around the disc at a distance of 90°, it is possible to move a shaft throughout an entire 360°. In this manner, the work holding arm disc 95 is moved back every 90° while the work piece 5 is held stationary by means of disc 91.

In the claims, the term "extension of work piece," refers to a work piece mandrel or to the work piece itself. It will be understood that in some applications a mandrel is not necessary such as in machining a spline shaft. In such cases, the holding fixture assembly can be directly mounted onto the shaft. In other instances, the holding fixture assembly is mounted onto the mandrel holding the work piece.

What I claim as new is:

1. For use with a machine tool containing diametrically opposed spindles in which each spindle contains a center, an indexing fixture for making suitable divisions of a work piece rotatably supported by the centers, which comprises
    (1) a holding fixture assembly directly mounted on an extension of said work piece which includes:
        (a) mounting means containing a keeper member for mounting said assembly,
        (b) an arm connected to said mounting means, and
        (c) an indexing finger mounted on said arm so that its axis is perpendicular to that of said arm,
        (d) said mounting means comprising:

(1) a first disc and hub assembly for mounting said assembly to said extension of said work piece in which
    (a) said disc contains indicia for direct indexing of said work piece,
    (2) a second disc rotatable independently of said first disc and connected to said arm,
    (3) locking means for locking said first and second discs into non-rotatable engagement, and
(2) a plate assembly directly mounted on one of said spindles which includes
    (a) mounting means containing a keeper member for mounting said plate assembly on said spindle,
    (b) a surface for engagmeent with the indexing finger of said holding fixture assembly,
whereby said work piece is locked into position through engagement of the holding fixture assembly with said plate assembly.

2. For use with a machine tool containing diametrically opposed spindles in which each spindle contains a center, an indexing fixture for making suitable divisions of a work piece rotatably supported by the centers, which comprises
(1) a holding fixture assembly directly mounted on an extension of said work piece which includes:
    (a) mounting means containing a keeper member for mounting said assembly,
    (b) an arm connected to said mountnig means, and
    (c) an indexing finger mounted on said arm so that its axis is perpendicular to that of said arm, and
(2) a plate assembly directly mounted on one of said spindles which includes:
    (a) mounting means containing a keeper member for mounting said plate assembly on said spindle,
    (b) a first plate containing an upper convex arcuate surface containing indicia on at least a portion of the periphery thereof,
    (c) a second plate rotably journaled on said mounting means and containing scribe marks registerable with said indicia,
        (1) said second plate containing an engagement surface to engage with the indexing finger of said holding fixture assembly so that the movement of said second plate moves the work piece through the movement of said holding fixture assembly,
        (2) locking means locking the first plate and the second plate in non-rotatable engagement,
whereby said work piece is locked into position through engagement of the holding fixture assembly with said plate assembly.

3. An indexing fixture as defined in claim 2 in which
    (1) said first plate contians a series of equally spaced holes in a convex arc pattern across the upper surface thereof and in which
    (2) said second plate contains a dial post containing one or more retractable dial pins engageable in said holes.

4. An indexing fixture as defined in claim 3 in which said second plate contains:
    (1) a dial arm rotatably journaled on said dial post,
        (a) said dial arm having at least one arcuate slot which functions as a cam surface for engagement with the indexing finger of said holding fixture assembly,
        (b) said dial arm containing a body portion and a pointer portion,
    (2) said second plate containing a third plate fitted into said second plate so as to correspond with the arc of travel of said body and pointer portions of said dial arm,
        (a) said third plate containing indicia which are subdivisions of the indicia contained on the first plate,
    (3) locking means where by said dial arm may be locked at a particular point of division and thereby locking the holding fixture assembly through engagement of the indexing finger and said arcuate slot.

5. An indexing finger as defined as claim 4 in which:
    (1) said second plate contains a concave arcuate slot,
    (2) said dial arm contains a bolt having a locking nut in which the body of said bolt rides in said arcuate slot so that tightening of said locking nut locks the dial arm in engagement with the second plate.

References Cited by the Examiner
UNITED STATES PATENTS
1,137,408   4/1915   Leonard _____ 90—11.66

OTHER REFERENCES
O'Brien, J. J.: How to Run a Lathe, South Bend Lathe Works, 1942, pp. 86.

WILLIAM W. DYER, JR., *Primary Examiner.*
G. A. DOST, *Assistant Examiner.*